(12) United States Patent
Halperin et al.

(10) Patent No.: US 8,914,730 B2
(45) Date of Patent: Dec. 16, 2014

(54) UNIFIED SECURE VIRTUAL MACHINE PLAYER AND REMOTE DESKTOP CLIENT

(75) Inventors: Yaron Halperin, Sunnyvale, CA (US); Jad Chamcham, Mountain View, CA (US); Christian Matthew Leroy, San Francisco, CA (US); Gerald I. L. Cheong, East Palo Alto, CA (US); Matthew B. Eccleston, San Francisco, CA (US); Noah Wasmer, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 352 days.

(21) Appl. No.: 13/544,819

(22) Filed: Jul. 9, 2012

(65) Prior Publication Data

US 2012/0278726 A1 Nov. 1, 2012

Related U.S. Application Data

(63) Continuation of application No. 12/560,349, filed on Sep. 15, 2009.

(60) Provisional application No. 61/097,115, filed on Sep. 15, 2008.

(51) Int. Cl.
  *G06F 3/00* (2006.01)
  *G06F 21/53* (2013.01)
  *G06F 17/30* (2006.01)

(52) U.S. Cl.
  CPC .......... *G06F 21/53* (2013.01); *G06F 17/30873* (2013.01)
  USPC ................ 715/742; 715/743; 718/1; 709/225

(58) Field of Classification Search
  CPC ................................................. G06F 17/30873
  USPC ........................ 715/742, 743; 718/1; 709/225
  See application file for complete search history.

(56) References Cited

U.S. PATENT DOCUMENTS

| | | | |
|---|---|---|---|
| 7,526,561 B2 | 4/2009 | Bloch et al. | |
| 7,739,738 B1 | 6/2010 | Sobel et al. | |
| 7,793,060 B2 | 9/2010 | Zohar et al. | |
| 8,209,408 B1 * | 6/2012 | Huang et al. | 709/223 |
| 2003/0233404 A1 | 12/2003 | Hopkins | |
| 2004/0117438 A1 | 6/2004 | Considine et al. | |
| 2005/0235043 A1 | 10/2005 | Teodosiu et al. | |
| 2006/0101189 A1 | 5/2006 | Chandrasekaran et al. | |
| 2007/0174429 A1 | 7/2007 | Mazzaferri et al. | |
| 2007/0260702 A1 | 11/2007 | Richardson et al. | |
| 2007/0300220 A1 | 12/2007 | Seliger et al. | |

(Continued)

OTHER PUBLICATIONS

International Search Report and Written Opinion as mailed in PCT Application No. PCT/US2009/034731 on Sep. 30, 2009.

*Primary Examiner* — Tadeese Hailu (57) ABSTRACT

A virtual machine (VM) is accessed by receiving user log-in information, the log-in information identifying a user and a corresponding VM, the VM having a local copy and a remote copy. A selected copy of the VM is identified based on at least one of a policy and a user selection, the selected copy being one of the local copy and the remote copy of the VM. A desktop generated by the selected copy of the VM is presented to the user in a common application graphical user interface, the common application graphical user interface being used regardless as to whether the selected copy of the VM is the local copy or the remote copy.

20 Claims, 4 Drawing Sheets

(56) References Cited

U.S. PATENT DOCUMENTS

| | | |
|---|---|---|
| 2008/0086540 A1 | 4/2008 | Scott et al. |
| 2008/0098006 A1 | 4/2008 | Pedersen et al. |
| 2008/0196043 A1 * | 8/2008 | Feinleib et al. ............... 719/319 |
| 2008/0201414 A1 | 8/2008 | Amir Husain et al. |
| 2008/0235361 A1 | 9/2008 | Crosbie et al. |
| 2008/0307408 A1 | 12/2008 | Saldhana |
| 2009/0055507 A1 | 2/2009 | Oeda |
| 2009/0216975 A1 | 8/2009 | Halperin et al. |
| 2010/0306773 A1 | 12/2010 | Lee et al. |

* cited by examiner

UNIFIED SECURE VIRTUAL MACHINE PLAYER AND REMOTE DESKTOP CLIENT

CROSS-REFERENCE TO RELATED APPLICATIONS

This Application is a continuation of U.S. patent application Ser. No. 12/560,349, entitled "UNIFIED SECURE VIRTUAL MACHINE PLAYER AND REMOTE DESKTOP CLIENT," filed on Sep. 15, 2009 and claims benefit of U.S. Provisional Patent Application 61/097,115, which was filed on Sep. 15, 2008, both of which are incorporated herein by reference.

This Application is related to U.S. patent application Ser. No. 12/390,819, filed Feb. 23, 2009, which is incorporated herein by reference.

BACKGROUND

A virtual machine is a computer system having a state that is abstracted in software. Virtually any application that can be executed on a physical computer system can be executed in a virtual machine using virtualization software. Virtualization software is software that is logically interposed and interfaces with a virtual machine and the physical computer system. Each virtual machine runs an operating system, referred to herein as the "guest OS" and applications.

VMware Inc. of Palo Alto, Calif., and other virtualization software companies, make available virtual machine (VM) "players" that allow a user to run a VM on commodity host platform such as an x86 processor with Windows or OS/X from Apple Computer of Cupertino, Calif. The VM may be virtually any operating system compatible with x86 architectures or derivatives thereof (e.g., IA-32, IA-64, AMD64, x86-64, etc.).

The player therefore allows a user to access a desktop provided by a VM on the commodity host platform. The user accesses the virtual machine through a user interface that presents the virtual machine desktop to the user, e.g., either in a full screen view or in a window on the host's desktop.

It is also possible to use a remote desktop client to access a virtual machine remotely. A remote desktop client is a computer program that communicates user interface information with a remote computer system. Generally, the user interface information includes display data, which is received from the remote computer system and displayed on the computer local to the user, and sends keyboard and mouse inputs generated by the user to the remote computer system. In this way, applications executing remotely from the user can be accessed and interacted with by the user. Remote desktop clients are typically used to access a remote desktop server, which may be a software component of the operating system of the remote computer system being accessed, or an application running on the remote computer system. Example protocols include Remote Desktop Protocol (RDP) by Microsoft, Virtual Network Computing (VNC), which has multiple implementations by several open source and commercial software houses, and Independent Computing Architecture (ICA), which is created by Citrix, Inc. Although originally created to access physical computer systems, remote desktop clients have also been used to access the desktops of virtual machines.

As with the virtual machine player, the remote desktop client presents the desktop of the remote computer system using the full screen of the user's computer system, or in a window on the user's display. Because remote desktop clients package the display contents and other information for network communication, remote desktop clients generally provide a degraded user experience from the experience of a local user directly accessing a computer system. This is particularly the case where the application being accessed generates rich graphics (e.g., video or three-dimensional graphics) or the latencies are increased due to the distance between the remote desktop client and server.

SUMMARY

A virtual machine (VM) is accessed by receiving user log-in information, the log-in information identifying a user and a corresponding VM, the VM having a local copy and a remote copy. A selected copy of the VM is identified based on at least one of a policy and a user selection, the selected copy being one of the local copy and the remote copy of the VM. A desktop generated by the selected copy of the VM is presented to the user in a common application graphical user interface, the common application graphical user interface being used regardless as to whether the selected copy of the VM is the local copy or the remote copy.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
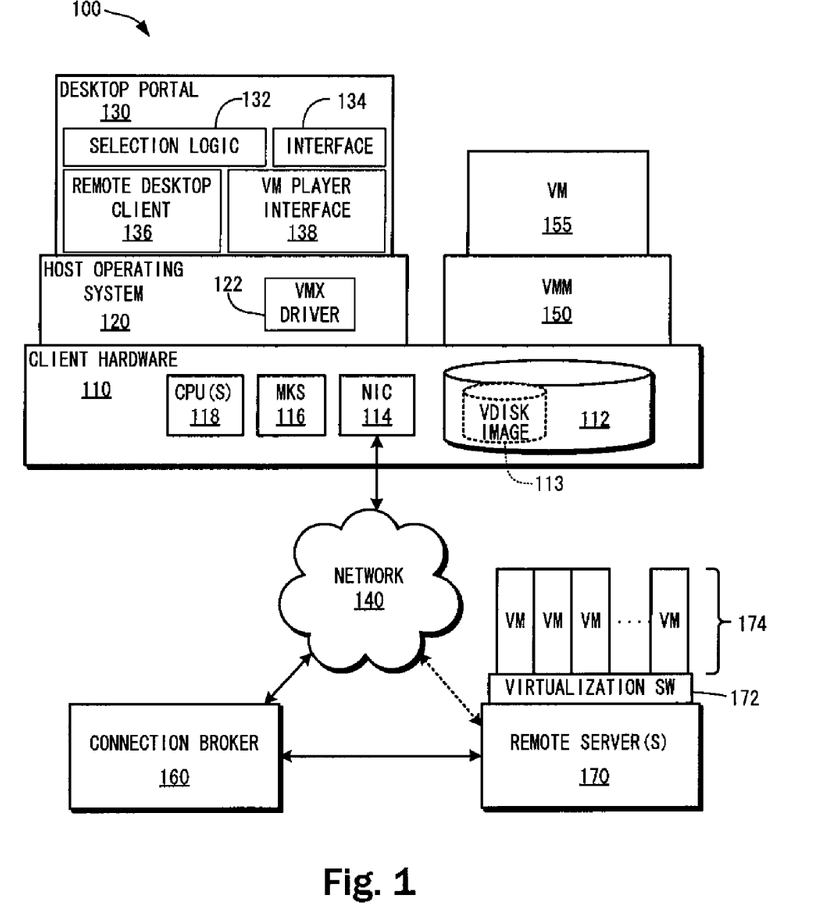
FIG. 1 presents an overview of a system implementing a unified secure virtual machine player and remote desktop client.

FIG. 1 presents a system 100 allowing a user to access a copy of a particular VM, regardless as to whether the copy of the VM is executing locally or remotely, using just one program and graphical user interface, the program being referred to herein as a desktop portal. System 100 comprises client hardware 110, which may be a general purpose computer system such as a workstation, laptop, etc., for use by an end user. In one embodiment, hardware 110 includes one or more processors (CPUs) 118, mouse, keyboard, and screen interfaces (MKS) 116, network interface card (NIC) 114, and disk 112 for non-volatile data storage. Disk 112 may be implemented using traditional rotating media or using a solid state technology. Client hardware 110 is in electronic communication with connection broker 160, which is in communication with remote server 170. In one embodiment, e.g., where client hardware is on the same local area network as remote server 170, client hardware 110 is also in electronic communication with remote server 170. Remote server 170 executes virtualization software 172, which supports one or more VMs 174.

A host operating system 120 runs at the system level on client hardware 110. Host operating system 120 may be an embedded operating system or a commodity operating system such as Microsoft Windows. The host operating system manages the system resources of client hardware 110, e.g., CPU(s), random access memory (not shown), disk 112, etc. Also running at system level is virtual machine monitor (VMM) 150, which supports VM 155. VMM 150 is in communication with VMX driver 122, which coordinates context changes between VMM 150 execution and host OS 120 execution, and allows host OS 120 to manage system resources for both applications running directly on host OS 120 as well as VMM 150, and by extension VM 155. Details of this relationship are described, e.g., in U.S. Pat. No. 6,944,699 entitled "System And Method For Facilitating Context-Switching In a Multi-Context Computer System," which issued to Bugnion et al. on Sep. 13, 2005.

U.S. patent application Ser. No. 12/390,819 filed Feb. 23, 2009, describes a system for "checking-out" a virtual machine (VM) from a remote server to a user's computer (e.g., desktop or laptop). According to that application, when a remote copy of the VM is executing on the remote server, the user can access the remote copy of the VM using a remote desktop display protocol such as RDP, VNC, etc. Once the VM is checked-out from the remote server, a copy is created on the user's local machine for use with the VM player.

When a user checks-in or -out a VM, a duplicate copy of the original VM is created, and the original may, and generally does, become stale. The designation as to whether a particular copy of a VM is stale becomes important as described below. A stale VM is the one or more of a plurality of copies of a VM, that is (or are) not the most recently modified copy.

From the viewpoint of the user's local machine, when a VM is checked out, the copy on the server becomes stale as soon as the user modifies the local copy of the VM. That is, the local copy of the VM copy and the remote copy of the VM copy are synchronized when the user "checks-out" the VM, and the definition of the VM, including its state, permissions and configuration, and disk contents are transmitted from remote server 170 to client hardware 110 so that the two copies of the user's VM are identical. However, once the local copy of the VM is changed, the copies of the VM are no longer synchronized and the remote copy is assumed to be stale. The changes result from user interaction with the VM. For example, the user may install a program or create or edit a file, such as a document, which is stored on the VM's virtual disk, thereby altering the contents of the virtual disk associated with the local copy of the VM.

Again, from the viewpoint of the user's local machine, when a VM is checked in to the remote server, the copy on the user's local machine is assumed to be stale. This is because the user may access the remote copy of the VM from a different computer, and the local system would have no way of knowing that the checked-in copy has since been modified. Therefore, the user may be prevented from accessing the stale copy on the user's local machine.

From the perspective of connection broker 160, the remote copy of VM 174 is immediately assumed to be stale once checked-out by the user. Again, this is because connection broker 160 has no way of knowing that the user did not interact with local copy of VM 155 while not connected to the Internet. When the local copy of VM 155 is checked back into one of remote servers 170 (either the same server or a different server) local copy of VM 155, depending on implementation, may immediately be assumed to be stale or be considered stale once remote copy of VM 174 is modified.

Returning now to FIG. 1, host operating system 120 provides an execution environment for applications designed to run thereon. Among these applications is desktop portal 130, which provides a single point of entry by the user to interact with his or her VM regardless as to whether it is presently local copy of VM 155 or remote copy of VM 174. Desktop portal 130 includes several components, including selection logic 132, user interface 134, remote desktop client 136 and VM player interface 138.

Selection logic 132 receives log-in information from the user (e.g., by interface 134) and accesses location information of the user's VM. Selection logic 132 can implement or initiate VM check-in and check-out operations, allow the user to select which copy of the VM to access. In alternate embodiments, selection logic 132, based on configurable rules, selects an appropriate copy of the VM for a user, as described in more detail below.

The location information may be maintained locally by selection logic 132. Alternatively, or in addition thereto, the location information may be hosted by connection broker 160 or a database accessible by connection broker 160. Location information can also be hosted in some other location accessible by one or both client hardware 110 and connection broker 160, e.g., using a discovery service.

For example, if the VM had most recently been checked-out, then the locally-maintained location information will indicate that the user's VM is available locally. The user may then be given an option to check the VM back in, i.e., upload the changed portion of the VM to remote server(s) 170, or begin working on the local copy of the VM. On the other hand, if the VM has most recently been checked in, then the location information will indicate that the VM is available remotely.

If the user accesses a local copy of the VM, then the selection logic invokes VM player interface 138 to interact with local copy of VM 155. On the other hand, if the user accesses a remote copy of the VM, then selection logic invokes desktop client 136 to connect to and interact with remote copy of VM 174. Regardless which copy of the user's VM the user connects to, desktop portal 130 provides a unified interface and for a common user experience.

In one embodiment, the connection to the most appropriate VM is automatically made for the user. That is, the user may be automatically connected to the remote or local copy of the VM, whichever copy is not stale. Alternatively, the user may be required to access a preferred copy of the VM, as designated by the user and/or administrator according to a policy. In one embodiment, the user accesses remote copy of VM 174 while the local copy of VM 155 is constantly or periodically and invisibly updated to reflect the changes, and at the end of the user session, both copies are synchronized with any necessary final changes. Likewise, the user may be preferentially connected to the local copy of the VM, e.g., in case latency between the client hardware 110 and remote server 170 causes a significant degradation in user experience. In this case, the remote copy of the VM may be continuously or periodically updated to reflect the changes to the user's local copy of VM 155. Leaving local copy of VM 155 and remote copy of VM 174 in a synchronized state at the end of the user's session provides an opportunity for flexibility at the next user session. For example, if client hardware 110 is a laptop and is not connected to network 140 at the next user session, then local copy of VM 155 may be accessed.

An administrative policy may be set to turn off automatic background synchronization, e.g., to preserve network bandwidth. In this case, one or both copies of the user's VM may be stale. (Both copies of the VM may be stale if the user previously checked out the VM to a different computer than client hardware 110.) If the location information indicates that the VM is available remotely (e.g., because it has most recently been checked in) then selection logic 132 may check for Internet or network connectivity (i.e., over network 140, which may be a wide-area network such as the Internet, or a local area network, or a combination thereof) by attempting to access connection broker 160. If connection broker 160 is accessible, then location information stored by connection broker 160 can be accessed to determine if remote copy of VM 174 is stale. If remote copy of VM 174 is not stale, then the user may be immediately connected to remote copy of VM 174. If connection broker 160 is inaccessible, or both local and remote copies of the VM 155, 174 are stale, the user, depending on permissions assigned by an administrator, may be informed that a "fresh" VM is currently unavailable, and given the opportunity to connect with a stale VM copy, either local copy of VM 155 if there is no connectivity and the VM has been previously checked-in, or either local or remote copies of VM 155, 174 if they are both stale. In an alternate embodiment, the user may be prevented from accessing a stale copy of the VM at any time, or is directed to contact a support administrator, to obtain special permission to access a stale copy of the VM. These and other safeguards may be implemented according to policies set by a systems administrator.

In cases where a user is permitted to access a stale copy of a VM, the user may be informed that accessing a stale copy of the VM could result in a "roll-back" of the VM state to the state prior to the most recent check-in (or -out) of the VM. If the user decides to interact with the stale copy of the VM, then the location information (locally or at both locations) may identify that the VM has forked, with two copies of the VM having been separately modified since the most recent check-in or check-out event.

A copy of a forked VM may, according to user selection and/or permissions and policies set by an administrator, be ultimately abandoned or merged with a counterpart copy of the forked VM. Abandoning one of the copies means that it is overwritten with a fresh copy of the counterpart copy and any changes thereto are lost. Two copies of a forked VM may be merged according to an algorithm for comparing file dates. In one embodiment, a first copy of a VM is merged with a second copy of a VM by first identifying which copy is the most recently modified copy. Assuming the first copy of the VM is the most recently modified one, the second copy of the VM may then be checked for any user documents having timestamps that are newer than corresponding user documents in the first copy of the VM. If so, then the identified documents are copied into the first copy of the VM. In one embodiment, a prefix is attached to the file names of the copied files to ensure that no file is overwritten in the first VM.

VM information, which may include any one or more of configuration and policy information as well as one or more virtual disk images (VDISK IMAGE) 113, may be maintained on disk 112 in an encrypted format accessible only by desktop portal 130. Hence, policy and configuration settings are inaccessible to the end user and virtual disk contents cannot be tampered with by a user or any third party. This provides an inherently secure encapsulation of a user's desktop resources suitable for enterprise users who require anytime and anywhere access to their desktop without sacrificing centralized control. Furthermore, if client hardware 110 is a laptop, the data cannot be accessed if stolen by a third party due to log-in requirements at the desktop portal level.

Figure 2A:
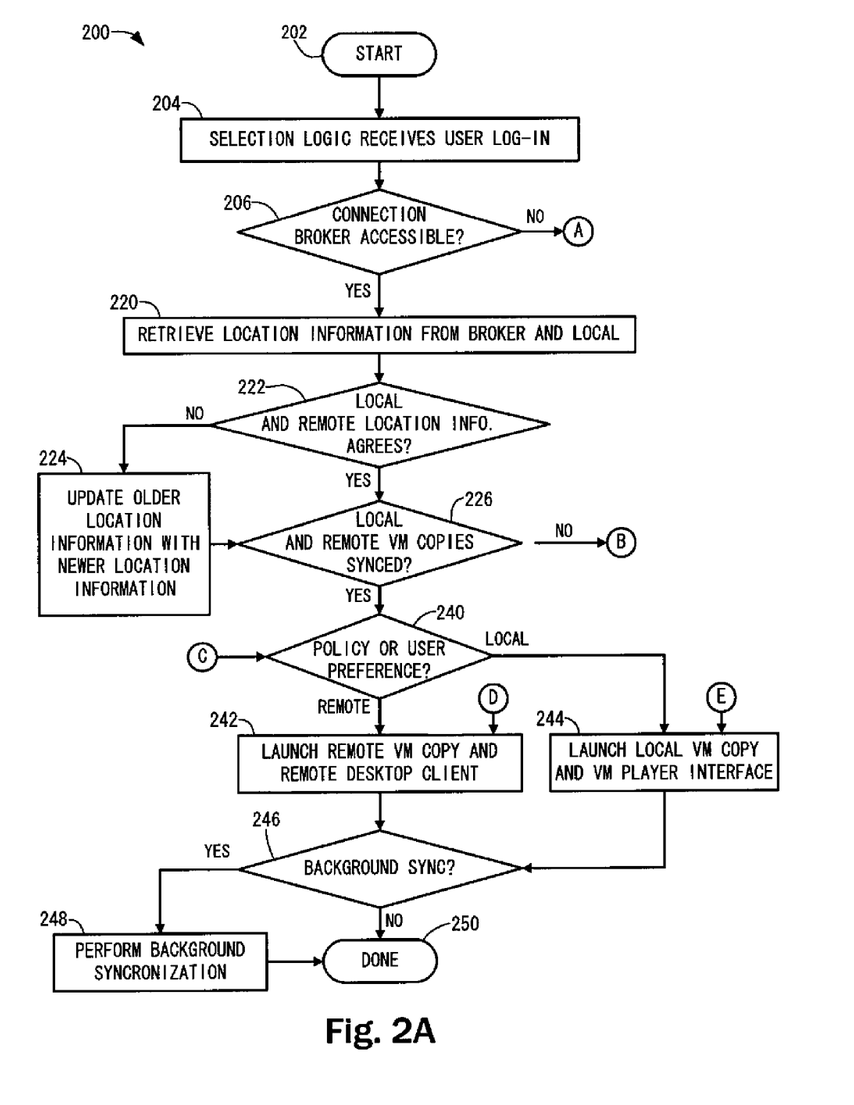
FIGS. 2A, 2B, and 2C show a flowchart illustrating by way of example a method for connecting a user to either a local or remote copy of the VM within desktop portal.
Figure 2B:
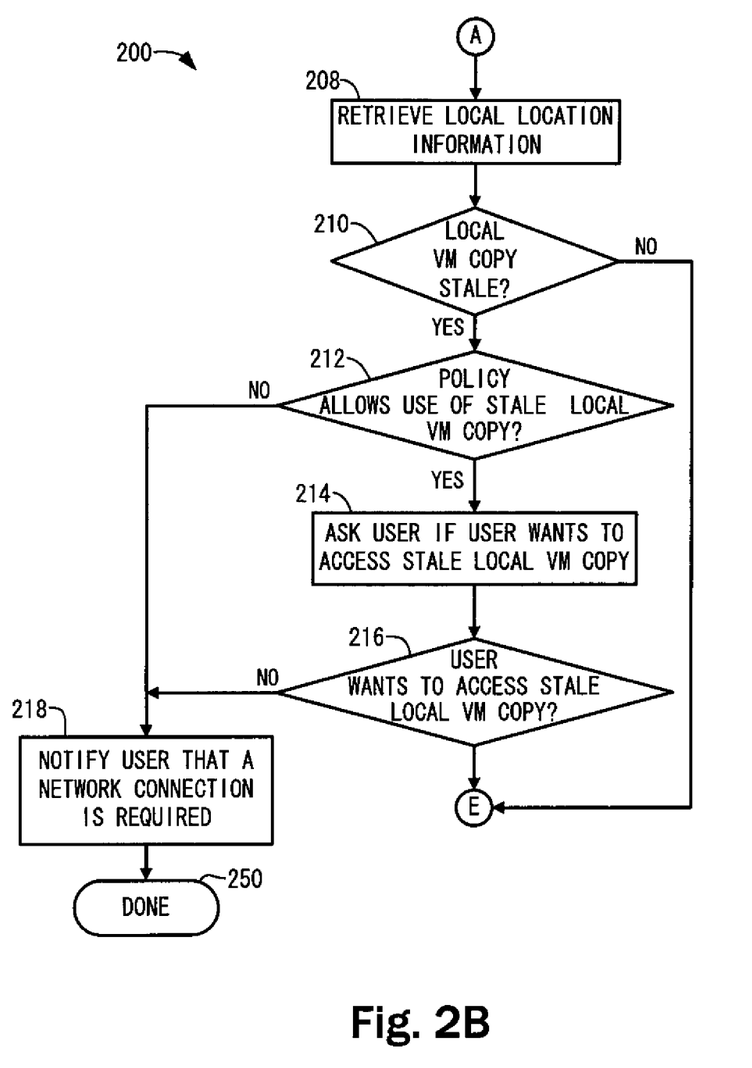
Figure 2C:
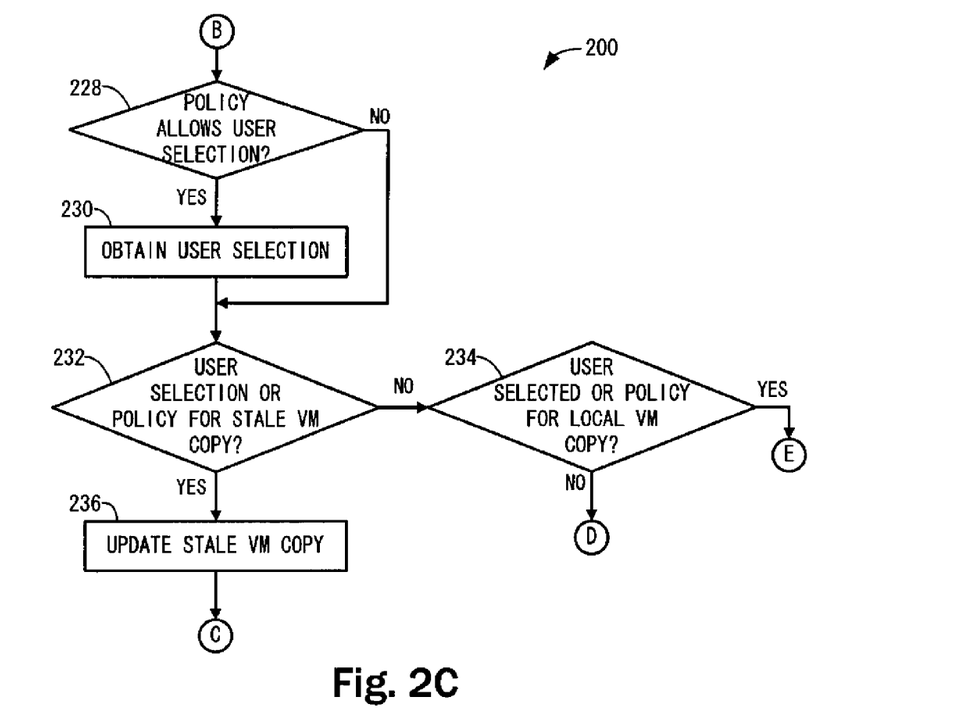

FIGS. 2A, 2B, and 2C show a flowchart 200 illustrating by way of example a method for connecting a user to either a local copy of his or her VM or a remote copy of the VM within desktop portal 130. The procedure begins as indicated by start block 202 and flows to operation 204 wherein selection logic 132 (FIG. 1) receives the user's log in information for initial authentication. The selection logic then, in operation 206 determines whether a connection broker is available. If a connection broker is available, then the procedure flows to operation 220, wherein the selection logic retrieves VM location information from the broker as well as from a local storage. As explained above, the VM location information identifies the most recently modified copy of the VM as known by the remote server (connection broker) and the local computer system.

In operation 222, the connection logic compares the local and remote location information. The local and remote information may disagree, for example, if the user had logged into the remote copy of the VM from a different client or most recently modified the local copy of the VM without being connected to the Internet. If the local and remote location information agree, then the procedure flows to operation 226. However, if the local and remote location do not agree, then the procedure flows to operation 224, wherein the older location information is updated (corrected) with the newer location information. The procedure then flows to operation 226.

In operation 226, the selection logic determines from the location information, whether the local and remote copies of the VM are in synchronization, i.e., whether they are identical, and therefore neither of them are stale. That this is truly the case can be verified by comparing contents of the local and remote copies of the VM, e.g., using a content identifier that is updated to a random value when the VM is modified and comparing the content identifiers of the local and remote copies of the VM.

If the local and remote copies of the VM are in synchronization, then the procedure proceeds to operation 240 wherein the previously-configured administrator policy is checked to determine which copy of the VM the user is permitted to access or if the user is permitted to select which copy of the VM to access. If the policy or user selects the remote copy, then the procedure flows to operation 242 wherein the remote copy of the VM is resumed or powered-on if necessary, and the user is connected to the remote copy of the VM using the remote desktop client 136 (FIG. 1), and the procedure flows to operation 246. If, in operation 240, the user or policy selection is for the local copy of the VM, then the procedure flows to operation 244, wherein the local copy of the VM is resumed or powered on as necessary, and VM player interface 138 is launched. The procedure then continues with operation 246.

In operation 246, the policy and/or prior user selection is accessed to determine whether background synchronization is enabled. If background synchronization is not enabled, then the procedure ends as indicated by done block 250. However, if background synchronization is enabled, then the procedure flows to operation 248 to commence background synchronization as previously described, and then the procedure ends as indicated by done block 250.

If, in operation 206, it is determined that the connection broker is inaccessible, e.g., the client is not currently connected to the Internet, then the procedure flows to operation 208 in FIG. 2B, wherein the local location information is retrieved. The procedure then flows to operation 210, wherein selection logic 132 determines from the local location information whether the local copy of the VM is stale e.g., because the VM was most recently checked in. If the local copy of the VM is not stale, then the procedure flows to operation 244 on FIG. 2A, which was earlier described. If the local copy of the VM is stale, then the procedure flows to operation 212 to determine whether the policy allows the use of a stale local copy of the VM. If the policy forbids access of a stale local copy of the VM, then the procedure jumps to operation 218 wherein the user is notified that a network connection is required, either to update the local copy of the VM or to access the remote copy. The procedure then ends as indicated by done block 250.

If, in operation 212, the policy is determined to allow the use of a local stale copy of the VM, then the procedure flows to operation 214 wherein the user is asked if they want to access the stale local copy of the VM. This query may come in the form of a warning or caution to the user that the VM copy is stale, and changes to the VM copy may be lost, etc. The procedure then flows to operation 216 wherein if the user does not want to access the stale local copy of the VM, the procedure flows to operation 218, and if the user does want to access the stale local copy of the VM, the procedure flows to operation 244 in FIG. 2A.

Returning to FIG. 2A, if, in operation 226, it is determined that the local and remote copies of the VM are not in sync, then the procedure flows to operation 228 in FIG. 2C, in which selection logic 132 determines whether the policy allows the user to make a selection between the local and remote copies of the VM, one of which may not be up to date, i.e., is stale. If a user selection is not permitted, then the procedure jumps directly to operation 232. However, if the user is permitted to make a selection, then the procedure flows to operation 230, wherein a user selection is obtained. The procedure then flows to operation 232.

In operation 232, selection logic 132 determines whether the user or policy selected a stale copy of the VM, i.e., one of the local or remote copies of the VM that happens to be stale. If so, then the procedure flows to operation 236 wherein the stale copy of the VM is updated with information from the non-stale copy of the VM. Thereafter, the procedure flows to operation 240 in FIG. 2A, previously described. If the user selection or policy was not for the stale copy of the VM, then the procedure flows to operation 234 to determine which of the local or remote copies of the VM is selected according to the user's selection or policy. If the remote copy of the VM is selected, then the procedure flows to operation 242 in FIG. 2A, previously discussed, and if not, then the procedure flows to operation 244 in FIG. 2A, also previously discussed.

Using a single desktop portal 130 (FIG. 1) system 100 allows the user to easily access whichever copy of his assigned VM is most appropriate in a single unified interface. Flowchart 200 does not address the situation where both copies of the VM are stale. For example, where the user checked the VM out to a different client than the client the user is presently using. In this case, the user may be permitted or prohibited to either of the stale VM copies based on the implemented policy.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s).

What is claimed is:

1. A method for accessing a virtual machine (VM) from a computer system, the method comprising:
    under control of a desktop portal, providing a user with a unified graphical interface to a VM regardless of whether the VM is accessed remotely or locally, the desktop portal comprising a VM player interface for accessing the VM when the VM is accessed locally and a remote desktop client for accessing the VM when the VM is accessed remotely, by:
        receiving user log-in information, the log-in information identifying a user and a corresponding VM, the corresponding VM having a local copy stored on the computer system and a remote copy stored on a separate server computer system;
        identifying a selected copy of the corresponding VM based on at least one of a policy and a user selection, the selected copy being one of the local copy and the remote copy of the corresponding VM;
        presenting a desktop generated by the selected copy of the corresponding VM to the user in the same unified graphical user interface, without regard as to whether the selected copy of the corresponding VM is the local copy accessed from the computer system or the remote copy accessed from the separate server computer system.

2. The method of claim 1, wherein the desktop portal comprises selection logic and a user interface, the selection logic performing the identifying and the user interface performing the presenting.

3. The method of claim 1, wherein the VM player interface accesses a desktop generated by the local VM when the selected copy of the corresponding VM is the local VM, and the remote desktop client accesses a desktop generated by the remote VM when the selected copy of the corresponding VM is the remote copy.

4. The method of claim 1, further comprising:
    determining which of the local copy and the remote copy of the corresponding VM is most recently modified;
    allowing the user to only access the most recently modified copy of the corresponding VM or to synchronize the copies of the corresponding VM, the synchronizing causing the copies to be identical with one another.

5. The method of claim 4, further comprising:
    performing background synchronization while the user is interacting with one of the copies of the corresponding VM, the background synchronization dynamically updating the other of the copies of the corresponding VM.

6. The method of claim 1, wherein the selected copy of the corresponding VM is a preferred copy of the corresponding VM, the policy requiring that the user access the preferred copy of the corresponding VM, the user being automatically connected to the preferred copy of the corresponding VM upon log-in.

7. The method of claim 6, wherein, when the preferred copy of the corresponding VM is not a most recently modified copy of the corresponding VM, the preferred copy of the corresponding VM is first updated so that it is identical with the most recently modified copy of the corresponding VM prior to the presenting of the desktop of the preferred copy of the corresponding VM.

8. The method of claim 1, wherein:
    the user is permitted to check in or check out the corresponding VM, the checking in comprising creating or synchronizing the remote copy of the corresponding VM from the local copy of the corresponding VM when the local copy is the most recently modified copy of the VM, the checking out comprising creating or synchronizing the local copy of the corresponding VM from the remote copy of the corresponding VM when the remote copy of the corresponding VM is the most recently modified copy of the corresponding VM; and
    wherein the selected copy of the corresponding VM is the local copy of the corresponding VM when the corresponding VM was most recently checked out and the selected copy of the corresponding VM is the remote copy of the corresponding VM when the corresponding VM was most recently checked in.

9. The method of claim 1, wherein the selected copy of the corresponding VM is a stale copy of the corresponding VM, the stale copy of the corresponding VM being a copy of the corresponding VM that is not the most recently modified copy of the corresponding VM, the method further comprising informing the user that accessing a stale VM could result in roll-back of the corresponding VM to a state prior to the most recent use.

10. A machine readable storage medium for providing access to a virtual machine (VM), the machine readable storage medium embodying computer code causing a computer system to access a virtual machine (VM) from a computer system by performing a method comprising:
    under control of a desktop portal, providing a user with a unified graphical interface to a VM regardless of whether the VM is accessed remotely or locally, the desktop portal comprising a VM player interface for accessing the VM when the VM is accessed locally and a remote desktop client for accessing the VM when the VM is accessed remotely, by:
        receiving user log-in information, the log-in information identifying a user and a corresponding VM, the corresponding VM having a local copy stored on the computer system and a remote copy stored on a separate server computer system;
        identifying a selected copy of the corresponding VM based on at least one of a policy and a user selection, the selected copy being one of the local copy and the remote copy of the corresponding VM;
        presenting a desktop generated by the selected copy of the corresponding VM to the user in the same unified graphical user interface, without regard as to whether the selected copy of the corresponding VM is the local copy accessed from the computer system or the remote copy accessed from the separate server computer system.

11. The machine readable storage medium of claim 10, wherein the desktop portal comprises selection logic and a user interface, the selection logic performing the identifying and the user interface performing the presenting.

12. The machine readable storage medium of claim 11, wherein the VM player interface accesses a desktop generated by the local VM when the selected copy of the corresponding VM is the local VM, and the remote desktop client accesses a desktop generated by the remote VM when the selected copy of the corresponding VM is the remote copy.

13. The machine readable storage medium of claim 10, wherein the method further comprises:
    determining which of the local copy and the remote copy of the corresponding VM is most recently modified;

allowing the user to only access the most recently modified copy of the corresponding VM or to synchronize the copies of the corresponding VM, the synchronizing causing the copies to be identical with one another.

14. The machine readable storage medium of claim 13, wherein the method further comprises:
performing background synchronization while the user is interacting with one of the copies of the corresponding VM, the background synchronization dynamically updating the other of the copies of the corresponding VM.

15. The machine readable storage medium of claim 10, wherein the selected copy of the corresponding VM is a preferred copy of the corresponding VM, the policy requiring that the user access the preferred copy of the corresponding VM, the user being automatically connected to the preferred copy of the corresponding VM upon log-in.

16. The machine readable storage medium of claim 15, wherein, when the preferred copy of the corresponding VM is not a most recently modified copy of the corresponding VM, the preferred copy of the corresponding VM is first updated so that it is identical with the most recently modified copy of the corresponding VM prior to the presenting of the desktop of the preferred copy of the corresponding VM.

17. The machine readable storage medium of claim 10, wherein:
the user is permitted to check in or check out the corresponding VM, the checking in comprising creating or synchronizing the remote copy of the corresponding VM from the local copy of the corresponding VM when the local copy is the most recently modified copy of the VM, the checking out comprising creating or synchronizing the local copy of the corresponding VM from the remote copy of the corresponding VM when the remote copy of the corresponding VM is the most recently modified copy of the corresponding VM; and
wherein the selected copy of the corresponding VM is the local copy of the corresponding VM when the corresponding VM was most recently checked out and the selected copy of the corresponding VM is the remote copy of the corresponding VM when the corresponding VM was most recently checked in.

18. The machine readable storage medium of claim 10, wherein the selected copy of the corresponding VM is a stale copy of the corresponding VM, the stale copy of the corresponding VM being a copy of the corresponding VM that is not the most recently modified copy of the corresponding VM, the method further comprising informing the user that accessing a stale VM could result in roll-back of the corresponding VM to a state prior to the most recent use.

19. A computer system comprising:
a memory;
a computer processor; and
a desktop portal, stored in the memory, comprising:
a unified graphical interface to a VM to a VM regardless of whether the VM is accessed remotely or locally;
a VM player interface for accessing the VM when the VM is accessed locally; and
a remote desktop client for accessing the VM when the VM is accessed remotely,
wherein the desktop portal is configured, when executed by the computer processor, to:
receive user log-in information identifying a user and a corresponding VM, the corresponding VM having a local copy stored on the computer system and a remote copy stored on a separate server computer system;
identify a selected copy of the corresponding VM based on at least one of a policy and a user selection, the selected copy being one of the local copy and the remote copy of the corresponding VM; and
present a desktop generated by the selected copy of the corresponding VM to the user in the same unified graphical user interface, without regard as to whether the selected copy of the corresponding VM is the local copy accessed from the computer system or the remote copy accessed from the separate server computer system.

20. The computer system of claim 19, wherein the desktop portal is further configured to determine which of the local copy and the remote copy of the corresponding VM is the most recently modified and only allow the user to access the most recently modified copy of the corresponding VM.

* * * * *